US009560468B2

(12) United States Patent
Fitzgerald et al.

(10) Patent No.: US 9,560,468 B2
(45) Date of Patent: Jan. 31, 2017

(54) COMMUNICATION SYSTEM

(75) Inventors: Michael Fitzgerald, County Kerry (IE);
Guy Waugh, County Kerry (IE);
Richard Lord, County Cork (IE);
Michael Godley, County Kerry (IE);
Christopher Young, Dublin (IE);
Joseph Cahill, County Kerry (IE);
Tadhg Crotty, County Cork (IE);
Edmond Higgins, County Cork (IE);
Paul Davern, County Cork (IE); Noor
Nashid Islam, Cork (IE); Cormac
John Sreenan, Cork (IE); Ahmed
Zahran, Cork (IE)

(73) Assignee: PARALLEL LIMITED, LLC,
Cranfield (GB)

( * ) Notice: Subject to any disclaimer, the term of this
patent is extended or adjusted under 35
U.S.C. 154(b) by 1112 days.

(21) Appl. No.: 13/362,392

(22) Filed: Jan. 31, 2012

(65) Prior Publication Data
US 2012/0198032 A1 Aug. 2, 2012

Related U.S. Application Data

(60) Provisional application No. 61/457,208, filed on Jan. 31, 2011.

(51) Int. Cl.
G06F 15/16 (2006.01)
H04W 4/00 (2009.01)
(Continued)

(52) U.S. Cl.
CPC ............ H04W 4/00 (2013.01); H04L 67/2842
(2013.01); H04L 67/02 (2013.01); H04L
67/104 (2013.01);
(Continued)

(58) Field of Classification Search
CPC ... H04W 4/00; H04W 88/182; H04L 67/2842;
H04L 67/104; H04L 67/2876; H04L
67/32; H04L 67/02
(Continued)

(56) References Cited

U.S. PATENT DOCUMENTS 8,565,689 B1* 10/2013 Rubin et al. ............... 455/67.11
2007/0058609 A1* 3/2007 Goel et al. .................. 370/352
(Continued)

OTHER PUBLICATIONS

Chinese Office Action issued Jun. 23, 2016 in Chinese patent application 201280017118.4 with English translation, 17 pages.
(Continued)

Primary Examiner — Abdullahi E Salad
(74) Attorney, Agent, or Firm — Oblon, McClelland, Maier & Neustadt, L.L.P.

(57) ABSTRACT

A communication system comprises a remote optimization server and a central optimization server adapted to communicate with each via a backhaul network. The central optimization server communicates with core network elements for data delivery. The servers provide access to local data servers, manage backhaul links, perform data caching, and optimize transmission of data that needs to be back-hauled in order to reduce data transfer via the backhaul network in a manner which is transparent to users and to core network elements. The servers perform compression and protocol optimization. The remote optimization server comprises a HTTP accelerator which uses client and server side optimization functions to retrieve a bundle of resources associated with a request for base HTML, and maintains a set of persistent connections over which all HTTP traffic is carried.

23 Claims, 4 Drawing Sheets

(51) Int. Cl.
*H04W 88/18* (2009.01)
*H04L 29/08* (2006.01)

(52) U.S. Cl.
CPC ............ *H04L 67/2876* (2013.01); *H04L 67/32* (2013.01); *H04W 88/182* (2013.01)

(58) Field of Classification Search
USPC .. 709/217–219, 232–235, 238–241; 370/235
See application file for complete search history.

(56) References Cited

U.S. PATENT DOCUMENTS

| | | |
|---|---|---|
| 2007/0099606 A1* | 5/2007 | Strohlein et al. ............. 455/423 |
| 2008/0228899 A1 | 9/2008 | Plamondon |
| 2009/0016282 A1* | 1/2009 | Gasparroni et al. .......... 370/329 |
| 2009/0279482 A1* | 11/2009 | Tinnakornsrisuphap et al. .............................. 370/328 |
| 2010/0177642 A1 | 7/2010 | Sebastian |
| 2010/0202286 A1* | 8/2010 | Miller et al. .................. 370/230 |
| 2010/0217934 A1 | 8/2010 | Martin |
| 2010/0302957 A1* | 12/2010 | Ketheesan .......... H04L 41/0893 370/252 |
| 2010/0322069 A1* | 12/2010 | Song et al. ................... 370/229 |
| 2011/0013605 A1* | 1/2011 | Moeller ........................ 370/338 |
| 2011/0151877 A1* | 6/2011 | Tafreshi ........................ 455/442 |
| 2011/0294474 A1* | 12/2011 | Barany et al. ............. 455/414.1 |
| 2012/0179810 A1* | 7/2012 | Contreras Delpiano et al. .............................. 709/224 |

OTHER PUBLICATIONS

Chinese Office Action issued Nov. 5, 2015 in Chinese Patent Application No. 201280017118.4 with English translation, 18 pages.

* cited by examiner

COMMUNICATION SYSTEM

FIELD OF THE INVENTION

The invention relates to communication of data, particularly data with images and/or video, and/or audio over wide area networks.

Referring to FIG. 1, in conventional mobile cellular data networks, data from the end user traverses the Base Station (e.g. Node-B, eNode-B . . . ), then the RNC where encryption is terminated, followed by the SGSN and GGSN before it appears as "standard" IP traffic.

Mobile data networks (for example 3G or 4G) have grown at an unprecedented rate over the past number of years. There are currently about 1.5 million 3G base stations (Node-B) deployed across the world. This number, which excludes Femto cells, is growing at a rate of about 300 k per year and this growth rate is expected to increase.

The demand for 3G capacity has been driven by a number of factors including:

USB modems; these devices enable laptops to connect to the Internet and corporate networks across 3G mobile networks. These modems are extremely popular with people who travel a lot or those who do not have access to WiFi, DSL or cable modems. Operators have typically introduced these devices on a flat rate billing system and it is not unusual to see "all you can eat" tariff plans for a fixed monthly fee.

Advanced handsets with Web browsing facilities consume multiples of the bandwidth of conventional handsets. Proliferation of these devices in 3G networks leads to capacity requirement increases of 200% to 300%.

As in traditional cellular systems operators are looking to deploy many more small cells to handle this capacity requirement. Many operators now deploy Femto cells inside consumer homes and business premises on a very large scale.

As a direct result of the increasing capacity of 3G networks in terms of number of sites and site capacity, the backhaul capacity requirements of these sites has increased by a similar percentage. Whereas a traditional macro 3G base station would have initially used say two E1 connections for voice and messaging (2×2 MBit/S) the same sites are now often being equipped with 6 to 8 of these E1 links to handle the extra capacity. Since in most cases operators lease their backhaul capacity on a per Mbit/s per month basis, minimizing back-haul costs is a high priority.

Another technique is to introduce Femto cells in the network. Femto cells are very small, low capacity (4 to 16 simultaneous users), low cost (sub $100) versions of the 3G Node-B. These Femto cells are usually deployed in the consumer home or business premises and typically use an existing DSL line to connect back to the core network. In other words the cellular operator is using the subscriber's own DSL line as backhaul. Technically this approach works quite well however optimisation/reduction of this bandwidth will ultimately be needed as 3G data throughput increases and ISP's object to the cellular operators using their infrastructure "for free". Another interesting aspect of the Femto cell design is that it includes the RNC element, whereby all elements of the Radio Access Network are contained within one unit.

The invention addresses the above problems.

SUMMARY OF THE INVENTION

According to the invention, there is provided a communication system comprising:

a remote optimisation server adapted to communicate with a base station, a central optimisation server adapted to communicate with the remote optimisation server via a backhaul network, and to communicate with core network elements for data delivery, and wherein the remote and the central optimisation servers are adapted to provide access to local data servers, to manage communication via the backhaul network, to perform data caching, and to optimise transmission of data communicated via the backhaul network in order to reduce data transfer via the backhaul network in a manner which is transparent to users and to core network elements.

In one embodiment, the remote and central optimisation servers are adapted to reduce transmission of data via the backhaul network in a manner which is transparent to users and to the core network elements.

In one embodiment, the central optimisation server is adapted to interface with the core network elements for supervision, user traffic, accounting, and security.

In one embodiment, the central optimisation server is adapted to emulate interfaces of a base station controller towards other core network elements.

Preferably, the central optimisation server is adapted to perform compression.

In one embodiment, the central optimisation server is adapted to perform protocol optimisation.

In one embodiment, the remote optimisation server is adapted to implement a subset of RNC, SGSN and GGSN functionality at the remote site to expose un-encapsulated and un-encrypted user IP traffic at the remote site so that this IP traffic can be managed and optimised.

In one embodiment, the remote optimisation server is adapted to perform direct IP access to local data stores, enabling local data access at the base station site and use of standard and enhanced IP optimisation techniques for backhaul communication.

Preferably, the remote optimisation server comprises a traffic classifier, a user data optimisation function, and a backhaul link manager. In one embodiment, the backhaul link manager is adapted to access a local data store.

In one embodiment, the central optimisation server comprises a backhaul link manager, a user data optimisation function, and a protocol relay function. Preferably, the remote optimisation server traffic classifier is adapted to perform traffic inspection and separation of the traffic into different categories, and tagging the different categories before submitting to the backhaul link manager.

In one embodiment, the remote optimisation server is adapted to block certain classifications of traffic from backhaul communication at certain times. In one embodiment, the backhaul link managers are adapted to dynamically select bearers according to traffic classification. Preferably, the selection is made according to quality-of-service criteria and user device.

In one embodiment, the servers are adapted to perform traffic optimisation including caching to ensure that only changed objects within a page are downloaded across the backhaul, pre-fetching; traffic analysis to determine data to be downloaded during off-peak times, data compression; compression algorithms for headers and payload, and header compression.

In one embodiment, the remote optimisation server comprises a HTTP accelerator which uses client and server side optimisation functions to retrieve a bundle of resources associated with a request for base HTML.

In a further embodiment, the HTTP accelerator is adapted to maintain a set of persistent connections over which all HTTP traffic is carried. Preferably, the HTTP accelerator has a split proxy architecture in which functionality is distributed across servers on both ends of the backhaul link. In one embodiment, a remote proxy appears as an HTTP proxy to a browser running on a user device at a remote site, and a central proxy acts as a typical Web client to Web servers.

In one embodiment, the optimisation servers are adapted to perform optimisation based on which objects are in the user's viewport; the size of the objects; the order in which the browser requests the objects; object type; the priority access group of the user. Preferably, IP traffic is directly associated with a specific cellular user identifier.

In another embodiment, the optimisation servers are adapted to perform the following in order to serve a HTTP Web page request:

when a base page is required at a client, an initial GET request is sent by the browser for this page;
a remote proxy intercepts this GET request and forwards the URL to a central proxy;
the central proxy fetches a base page associated with the URL from a Web server and passes it to a scheduler and compression engine of the central optimisation server, which schedules the base HTML for transfer to the remote site over persistent connections;
the central proxy parses the base HTML and immediately retrieves the associated Web resources that are embedded in that page, and compresses and schedules these resources for transfer to the remote site;
at the remote side, the remote proxy parses the base HTML to determine which resources will be transferred and then it passes the base HTML to the client; and when the client makes subsequent requests for the associated resources, the remote proxy first determines if the resources are being transferred and if so the request from the client is delayed until the resource arrives, otherwise, if this is a new request for a new base page then the system executes the steps outlined above.

In one embodiment, the optimisation servers are adapted to maintain transparency of peer-to-peer sessions of a mobile device while reducing data traffic on the backhaul link, wherein the remote optimisation server comprises a remote peer agent and the central optimisation server comprises a central peer agent, the remote peer agent acting on behalf of a mobile client's network peers, and the central peer agent acting on behalf of mobile clients, and said agents act transparently to both the mobile clients and to their network peers.

In another embodiment, the agents both cache data in a split symmetrical cache architecture, in which cache keys are exchanged between the servers via the backhaul link. Preferably, a server is adapted to inspect data which it sends to the other server, and to dynamically modify cache parameters including queue size, or key generation algorithms, or chunk size, or cache data retention policy. In one embodiment, the central peer agent is adapted to inform the remote peer agent that requested data is available on a secondary remote peer agent of the same or a different remote optimisation server of the system. In one embodiment, the agents are adapted to monitor peer-to-peer connections and locations of mobile clients. In one embodiment, the agents are adapted to use said monitored information to channel peer-to-peer data between peers on the same side of the backhaul network requiring little or no usage of the backhaul network.

In one embodiment, the agents are adapted to modify criteria for selecting peers when establishing and maintaining peer-to-peer connections.

Preferably, the criteria include location, quality of radio link, or capacity of a remote cell, or capacity of the backhaul link.

In one embodiment, the agents are adapted to maintain a client's identity, across multiple packet data protocol contexts.

In one embodiment, the servers are adapted to monitor activation and deactivation of packet data protocol PDP contexts, to allocate an identifier to each context, and sharing the identifiers with the other server.

In one embodiment, the remote and central optimisation servers are adapted to retrieve data through the core network even if it is delivered from a cache by the remote optimisation server without being sent over the backhaul link.

In one embodiment, the remote optimisation server is adapted to deliver said data only after it has been pulled through the core network to the central optimisation server. Preferably, the remote optimisation server is adapted to delay delivery until after receipt of a permission from the central optimisation server.

In a further embodiment, the remote optimisation server is adapted to monitor cache usage, and to decide on use of the backhaul network accordingly on the basis that more backhaul capacity will be available if the cache usage is high. Preferably, the remote optimisation server is adapted to dynamically modify quality-of-service parameters according to said monitoring of cache usage as an indicator of backhaul network usage.

In one embodiment, the system comprises a plurality of remote optimisation servers. In one embodiment, a remote optimisation server is adapted to push data to another remote optimisation server. In one embodiment, the remote optimisation servers are in a cluster architecture and share the same backhaul link.

In another aspect, the invention provides a computer program product comprising software code adapted to perform the optimisation server steps of a system as defined above in any embodiment.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

Figure 1:
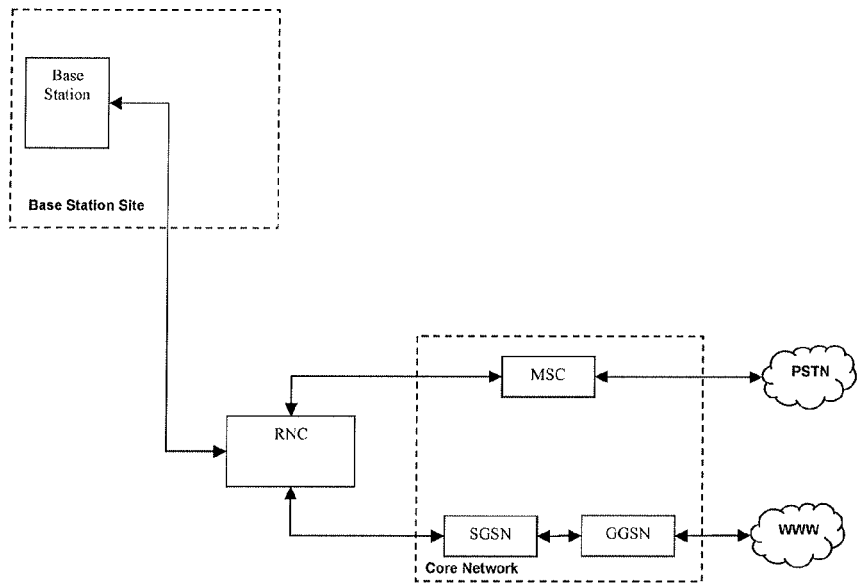
FIG. 1 is a diagram illustrating components of a typical mobile data network architecture of the prior art, as referred to above.
Figure 2:
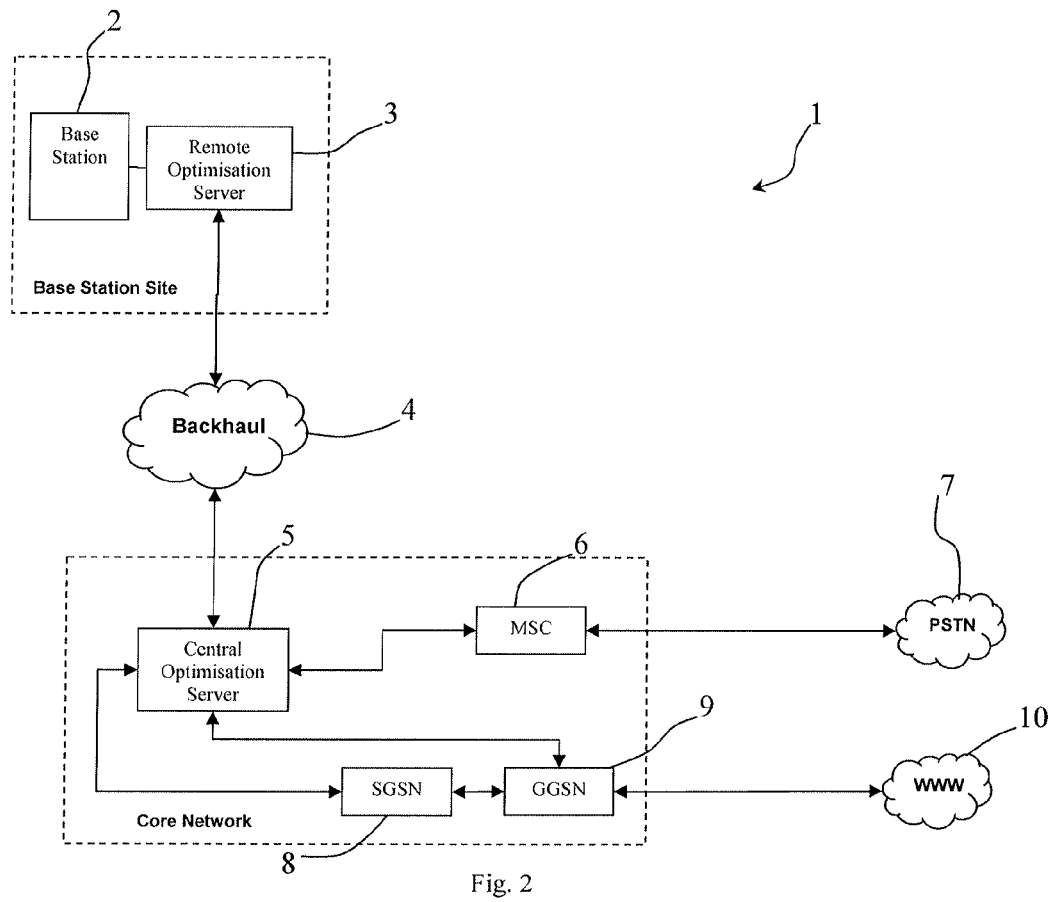
FIG. 2 is a diagram of components of a communication system architecture of the invention.

Referring to FIG. 2 a communication system 1 comprises a base station 2 and a remote optimisation server 3 at a remote site. This communicates over a backhaul network 4 with elements at a core network site. The latter are a central optimisation server 5, an MSC 6, an SGSN 8, and a GGSN 9. The MSC 6 communicates with a PSTN 7 and the GGSN with the Internet 10.

Figure 3:
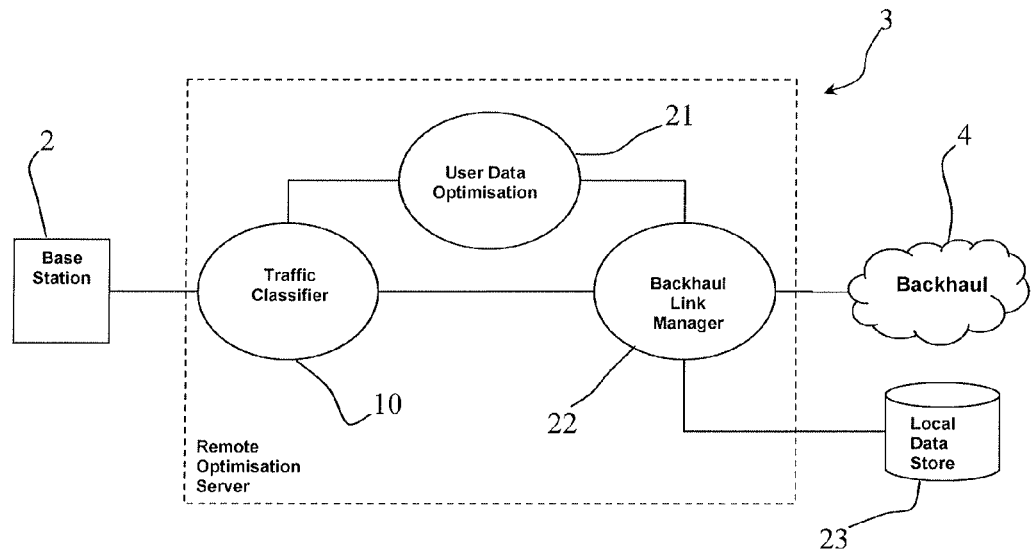
FIG. 3 is a block diagram illustrating architecture of a remote optimisation server, and FIG. 4 that of a central optimisation server.

As shown in FIG. 3, the remote optimisation server 3 comprises a traffic classifier 20, a user data optimisation function 21, and a backhaul link manager 22. The latter is linked with a local data store 23.

Figure 4:
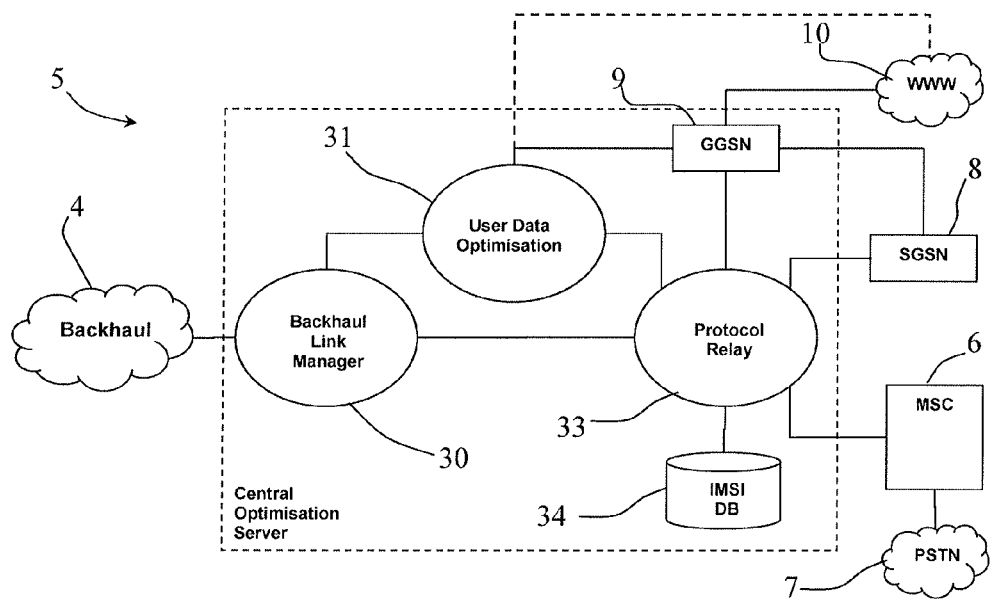

Referring to FIG. 4, the central optimisation server 5 comprises a backhaul link manager 30, a user data optimisation function 31, a protocol relay 33, and an IMSI database 34.

The RNC functionality, including the encryption endpoint, is implemented either within the Base Station 2 or in hardware physically located close to the base station 2. The effect of this change is to "flatten" the architecture and in doing so facilitate the implementation of optimisation techniques described below. Secondly, optimisation servers located at either side of the backhaul link 4 (remote and central) are introduced.

The main role of the remote optimisation server 3 is to provide support for local data access (e.g. local web-site), management of different backhaul links, data caching, and optimisation of the data that needs to be back-hauled.

The central optimisation server 5 is the counterpart of the remote optimisation server 3 located in the core network for optimisation of back-hauled data. The central optimisation server 5 interfaces with elements of the core network for billing, O&M, supervision, user traffic, and security. It behaves in a similar fashion to an RNC as perceived by the other (existing) core network elements. This facilitates integration to these core network elements. The central optimisation server 5 also handles some of the data optimisation features such as compression and protocol optimisation which are described below.

One of the advantageous features of the architecture is the implementation of a subset of RNC, SGSN and GGSN functionality at the remote site. This exposes the un-encapsulated, un-encrypted user traffic at the remote site so that this IP traffic can be managed and optimised.

Also, the flattened architecture enables direct IP access to local data stores; e.g. Enterprise web-site, local video server, local educational or health resources. This enables local data access at the base station site and use of standard and enhanced IP optimisation techniques on the backhaul network 4.

The remote optimisation server 3 performs traffic classification and service differentiation. There is traffic inspection using Deep Packet Inspection enabling identification of different traffic types such as VoIP, games, video, and VPN. This allows segregation of traffic into different priority categories which can then be tagged properly from a quality-of-service ("QoS") perspective before submitting to the backhaul network 4. This also enables identification and possibly blocking of certain unwanted traffic types such as VoIP if required.

Service differentiation of this prioritised traffic allows different bearers to be used for back-hauling different types of traffic. For example an urban Node-B may use high quality E1/T1 links for carrying QoS critical traffic such as voice or signalling, whereas non-critical data traffic (public Internet) can be backhauled over lower cost links such as DSL. Also, different QoS criteria can be applied based on the user's cellular identity and QoS parameters. For example, the HLR may contain cellular-specific QoS parameters for a particular user (IMSI) and these HLR parameters may be used at the remote site for prioritization of traffic to and from that user.

Also, the remote optimisation server 3 performs other IP optimisation techniques including:
Caching; caching ensures only changed objects within a page get downloaded across the backhaul.
Pre-fetching; traffic analysis determines content to be downloaded/broadcast during off-peak hours.
Data compression; compression algorithms for headers and payload.
Header compression.

The system 1 performs acceleration of the HTTP protocol which is of particular benefit when high latency backhaul links are in use.

Referring again to FIG. 3 the remote optimisation server 3 contains the following functional modules. The traffic classifier 10 examines packets from the base station and routes the traffic either directly to the backhaul link manager 22 or to the user data optimisation module 21. The traffic classifier 10 may also provide other functions such as blocking particular traffic types. The user data optimisation module 21 implements standard and enhanced IP data optimisation techniques for back-hauled user data. The backhaul link manager 22 maintains connections between the remote and central sites and prioritises the traffic using these connections. It also routes traffic to local data stores (web-sites) as required.

Referring to FIG. 4 the central optimisation server 5 comprises a backhaul link manager 30 to maintain connections between the remote and central sites and prioritise the traffic using these connections. The user data optimisation module 31 implements standard and enhanced IP data optimisation techniques for back-hauled user data. The protocol relay module 33 has two main functions; it converts (relays) the protocol used on the backhaul to standard protocols such as 3GPP Iu towards the core network elements. It also manages the separation of user data from signalling in coordination with the traffic classifier in the remote optimisation server 3 as described below. The latter function also maintains and uses a database of subscribers' IMSI identifiers.

The internal GGSN terminates traffic to and from the SGSN and is also used for tunnel management and access to the Internet.

The system 1 minimises the amount of user data transported across the backhaul network 4. This is achieved by accessing as much data locally (local web server, cached data) as possible and by optimising the user data that does have to traverse the backhaul network 4. This is done with little or no impact on the existing network operation. This user data traffic is separated from other essential network traffic such as signalling, the latter being passed transparently through the system, i.e. any compression of signalling traffic is loss-less and the traffic can be uncompressed at the other end.

Mobility management traffic such as location updating, authentication, handover, registration, and network attach is recognized as such by the traffic classifier 10 and is passed transparently through the system. When the protocol relay 33 detects a tunnel being set-up for user data it checks the subscriber's IMSI and decides whether or not optimisation can be applied to the particular subscriber's data. In certain cases, for example a roaming subscriber, it may not be required to optimise the data since it needs to transit through the subscriber's home network.

If the IMSI check is positive, then the protocol relay 33 sends a message including the IMSI and tunnel identifier to the remote user data optimisation module 21, instructing it to terminate the user data tunnel in the remote optimisation server 3. The user data optimisation module 21 terminates the tunnel and extracts the user data (IP traffic). This IP traffic is optimised and forwarded to the backhaul link manager 22.

The user data transits through the peer backhaul link manager 22 and the user data optimisation modules 31 in the central optimisation server 5. Based on configuration data the protocol relay 33 decides how the data should be routed externally. The possibilities include direct routing from the user data optimisation module 31 to an external network (e.g. Internet), routing from the user data optimisation module 31 through the internal GGSN 9 to an external network or routing through the SGSN 8 and the GGSN 9 to the external network. The main advantage of the first option is that traversing fewer network elements is more efficient, faster and uses fewer resources. The main advantage of routing through the SGSN 8 is that any existing billing or similar mechanisms are unaffected.

HTTP Accelerator

The Hypertext Transfer protocol (HTTP) is a stateless, transactional protocol that governs content exchange between Web clients and servers. HTTP features a sequential operation that delays the retrieval time of embedded Web resources. For example, when a client on the end-user's device issues a HTTP GET request for a particular web page, the Web server replies with the base HTML page containing references for other nested resources required by the client to display the page to the end-user. These resources are requested through further sequential HTTP GET requests over possibly new TCP connections opened by the client to the Web server. This sequential operation of the HTTP protocol performs very poorly over high latency backhaul links such as satellite links due to each individual operation being delayed by the high round trip time.

Conventional Web browsers do not typically aggregate their GET requests, instead they request the required resources one at a time. To overcome this sequential operation of HTTP, there are several well-known approaches specified to retrieve an aggregated set of resources, commonly known as bundles, from a server. These approaches can be generally classified as client-side and server-side solutions. This system 1 includes a HTTP accelerator which uses a mix of client and server side optimisation techniques to retrieve a bundle of resources associated with the request for the base HTML.

In addition, there are several Transmission Control Protocol (TCP) problems, which contribute to poor web page load performance over high latency backhaul links. For example there are problems related to the connection setup and slow start. The TCP three-way handshake (SYN-SYN-ACK) is used to establish TCP connections and to tear them down. For example a Web browser may be configured to open several TCP connections to a Web server. This process introduces a long delay into web page loading time over high latency backhaul links. The HTTP accelerator maintains a set of persistent connections, over which all HTTP traffic is carried.

Figure 5:
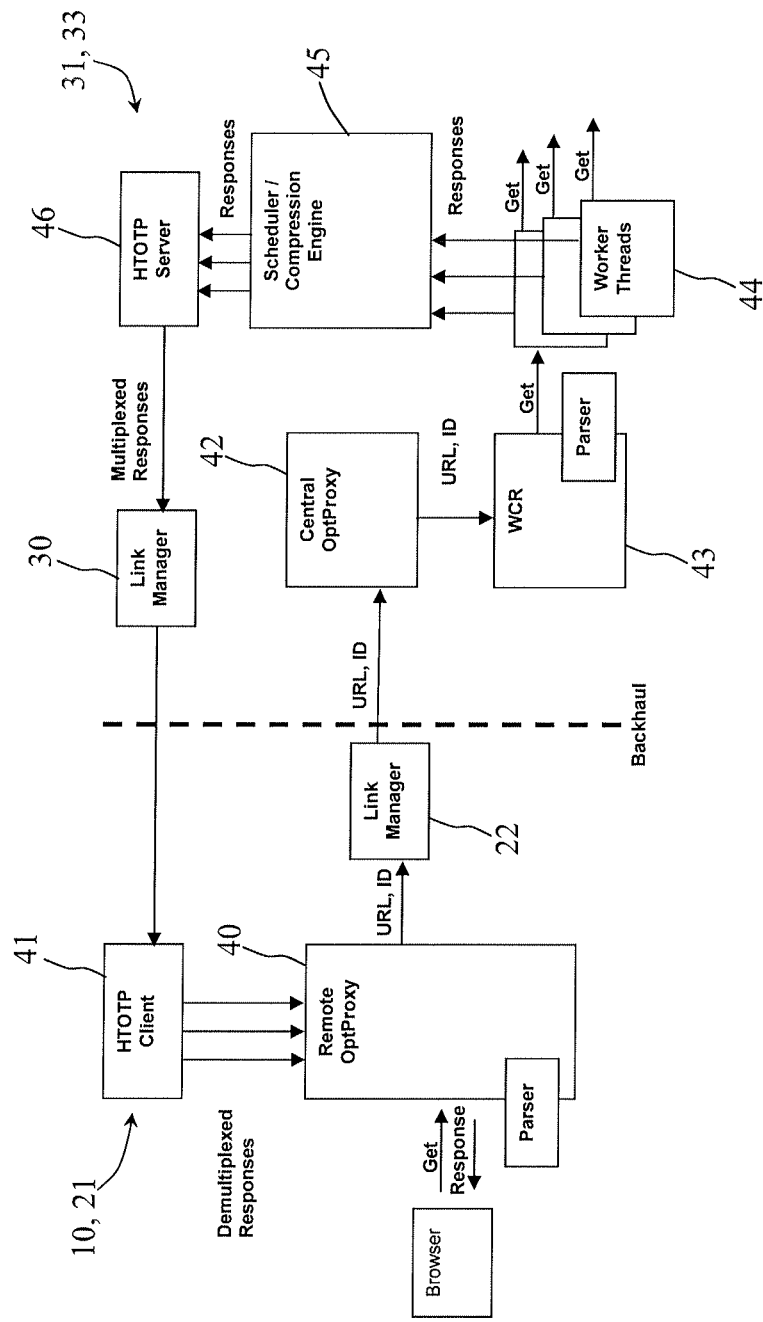
FIG. 5 is a diagram illustrating signal flows.

Referring to FIG. 5, a HTTP accelerator is distributed between the servers 3 and 5. It has a split HTTP proxy architecture by which the functionality is distributed between two proxy servers implemented at both ends of the backhaul network 4. A remote proxy (RemoteOptProxy) appears as an HTTP proxy to the browser running on the end user's machine at the remote site. A central proxy (CentralOptProxy) acts as a typical web client to web servers. Hence, the system "splits" the HTTP protocol at these proxies that communicate the web content using a novel bundling mechanism.

The functional blocks shown in FIG. 5 are as follows:
22, 30, remote and central link managers;
40, remote proxy (RemoteOptProx);
41, remote client ("HTOTP Client");
42, central proxy ("CentralOptProxy")
43, web content retrieval function ("WCR") with a parser;
44, worker threads;
45, scheduler and compression engine;
46, server ("HTOTP Server")

The role of the link managers 22 and 30 is to maintain connections between the remote and central sites and to prioritise the traffic using these connections. The web content retrieval function ("WCR") 43 includes a parser which parses the base HTML and decides which embedded resources need to be retrieved from the origin server. The worker threads 44 issue the individual GET requests to the origin servers and forward the responses to a scheduler.

The scheduler/compression engine 45 pushes the nested objects within a base HTML to the remote side in a priority fashion. This prioritisation is based on:
a) Which objects are in the user's viewport. The base html page may be many times larger than the displayable region of the browser's viewport. The end-user can only "see" the nested objects, which are in his/her viewport.
b) The size of the objects
c) The order in which the browser requests the objects.
d) Object type e.g. a CSS has a higher priority than an image.
e) The priority access group of the user. A novel aspect of this invention is that IP traffic can be directly associated with a specific cellular user identifier.

The scheduler 45 provides fairness across the active users while maintaining these priority categories when it pushes content to the remote side. Content such as images can be compressed at this point to further reduce the amount of data carried over the backhaul.

The HTOPT server 46 receives (prioritised) responses from the scheduler 45 and forwards these responses to the link manager 30 in a multiplexed stream. The role of the link manager 30 is to maintain connections between the remote and central sites and to prioritise the traffic using these connections. The HTOPT client 41 receives multiplexed responses from the scheduler 45 and forwards these responses to the Remote OptProxy 40 as individual responses.

At startup, RemoteOptProxy 40 and CentralOptProxy 42 establish a fixed number of TCP connections between themselves. This is only done during the setup phase and these connections are maintained throughout the system operation.

In order to serve an HTTP web page request, the system operates as follows:
   When a new web page is required at a client, an initial GET request is sent by the browser for this page (termed the base page).
   RemoteOptProxy 40 intercepts this GET request and forwards the URL to CentralOptProxy over one of the fixed connections.
   CentralOptProxy 42 fetches the base page associated with the URL from the web server and passes it to the scheduler/compression engine. The base HTML is scheduled for transfer to the remote site over the persistent connections.

CentralOptProxy 42 parses the Base HTML and immediately retrieves the associated web resources that are embedded in that page. These resources are compressed and scheduled for transfer to the remote site.

When the Base HTML is received at the remote side, RemoteOptProxy 40 parses it to determine which resources will be on the way from the ground. Then it passes the base HTML to the client.

When the client 41 makes subsequent requests for the associated resources, RemoteOptProxy 40 first determines if the resources are on the way from the ground side. If so the request from the client is delayed until the resource arrives. Otherwise, if this is a new request for a new base page then the system executes the steps outlined above.

The split architecture optimizes the web page retrieval in several different ways. First, the expensive three-way handshake over the satellite is eliminated as the TCP connections to the Web server are made at the ground site. Second, the initial GET for a particular base HTML causes a bundle of GET requests for its nested resources to be issued at the ground site. The associated resources are subsequently transferred from the ground to the remote site. This mechanism overcomes the sequential operation of HTTP. Third, the compression assists in reducing the amount of traffic crossing the satellite link.

One of the problems with the introduction of caching to the edge of a cellular network is that traditional operator functions such as Legal Intercept, Billing & Customer Care and QoS are impacted and stop functioning as expected as these functions typically reside in the operator's core network and as such are expecting all data and content to be served through the core network. With regard to billing, a cache hit may introduce various under billing and over billing scenarios. Legal Intercept requires bit exact data replication to a Legal Intercept server. QoS is also affected by caching as the cache hit ratio cannot be factored into QoS profiles. A cache hit at a Base Station site will served the data locally and will not come through the Operator's network thereby affecting these functions. As part of the remote optimization and central optimization servers, the invention implements a symmetrical caching structure where the cache keys and data are replicated at each node and upon a cache hit only a reference is transmitted between the backhaul link manager 3 and 30 in FIGS. 3 and 4. In FIG. 2, the data that passes between the remote optimisation server 3 and the base station 2 and between the central optimisation server 5 and SGSN 8/GGSN 9 is the actual data that would be present without the invention being in place. This aspect maintains an operator's legal intercept, billing and QoS functions. A typical operation scenario is as follows:

Users request some data from a web server on the internet, e.g. video clip server video stream.

On the first pass through the network, the data will not be present in the cache in the remote and central servers. The content is keyed for example using a hashing function and stored in a remote and central cache. The video in this case is passed through the backhaul with some optimization features such as protocol optimization.

On the second and subsequent pass through the network the content is keyed in the remote and central optimisation server and upon a cache hit only a reference is sent across the backhaul.

At the central optimization server, the original request and response of the subscriber will pass through the core network and therefore maintaining legal intercept, billing and QoS functions of the operator but the reference is sent across the backhaul.

At the remote optimisation server, the original or actual content is served from the remote optimization cache as indicated by the reference.

The nature of mobile cellular networks requires different approaches to the cache implementation. Web caches work well with static content such as HTML but have poor cache rates for video and dynamic content. Byte and object caches work well with multimedia content but byte caches for instance require a large key size for large file sizes such as video and peer to peer traffic. The system implements a layered cache approach with caches such as Web caches, object caches and chunk/byte caches and which are symmetrical in nature. As cellular signalling passes through the remote and central servers, the servers can adapt the data to a cache layer and hashing mechanism based on the best cache hit scenario, throughput and size of the data required. The cellular profile for a particular stream also identifies the particular context and QoS for the data session such as Conversational Real time, Streaming Real time, Interactive Best Effort and Background Best Effort while also specifying Radio Access Bearer characteristics such as max and guaranteed bit rates, error rates, payload size, and delays. The remote and central servers also perform packet inspection at the IP layer. The invention using the cellular parameters combined with IP packet analysis and inspection decides the cache parameters such as, the hashing key algorithm, the cache chunk size of the data payload, the cache purge policy, and the disk and memory management of the cache.

Another feature of the invention is that the remote and central optimisation servers 3 and 5 can monitor cellular mobility messages and geo-location data so cache data can be moved from remote node to remote node or purged in line with the subscriber's mobility.

Also, the remote and central optimisation servers 3 and 5 can use standard packet inspection techniques to aid QoS decisions but also to aid in cache pre-warming/pre-fetching where frequently used data is pre-cached based on subscribers' behaviour in a particular cell. The system can also take account of the subscriber's mobility patterns to decide which remote cache is preloaded with data that is relevant to a particular subscriber if group of subscribers in a cell.

Another feature of the system is that the remote optimisation server 3 can also be clustered together to share keys and data when a group of cells and remote optimization servers share the same backhaul. Also, the invention allows for dynamic modification of QoS profiles and behaviour to take account of cache hit ratios, protocol optimization and compression with subsequent bandwidth savings.

Whereas the preceding description relates to mobile (cellular) data networks such as 3GPP 3G and 4G networks the techniques described could equally well be applied to fixed broadband and other data network configurations.

Figure 6:
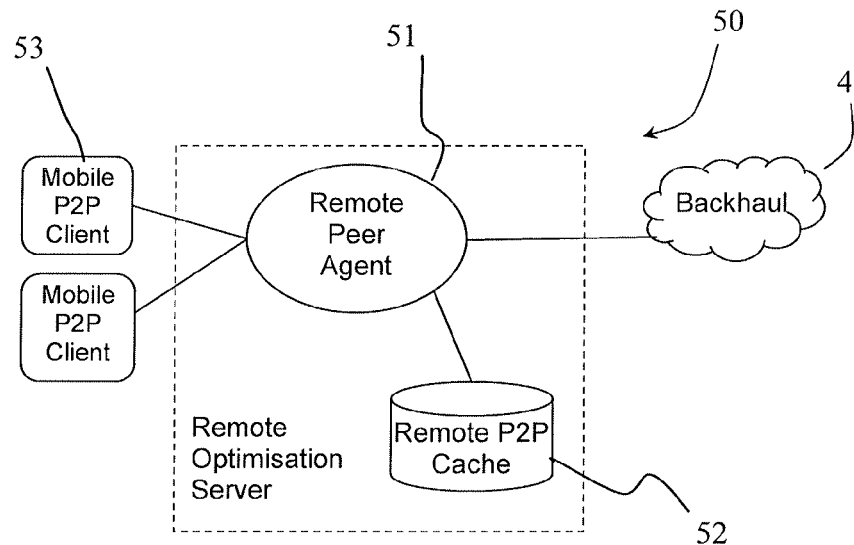
FIGS. 6 and 7 are diagrams illustrating alternative central and remote optimisation servers.
Figure 7:
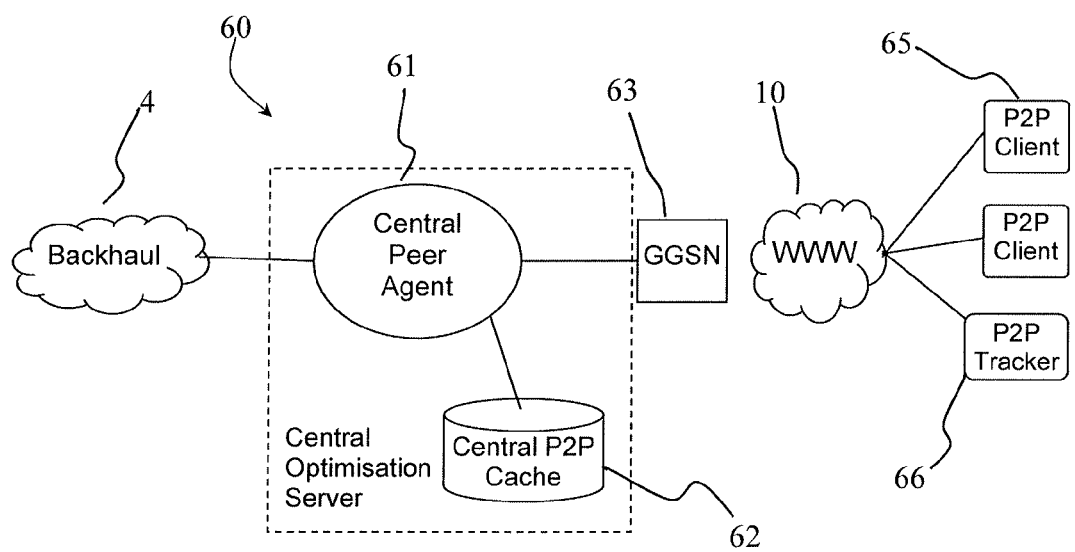

Referring to FIGS. 6 and 7, in another embodiment a remote optimisation server 50 comprises a remote peer agent 51 (RPA) and a remote peer-to-peer ("P2P") cache 52, and it is shown communicating with mobile clients 53. A central optimisation server 60 has a central peer agent 61 (CPA) and a central P2P cache 62. It communicates with an external GGSN 63 and onwards via the Internet 10 with P2P clients 64 and a P2P tracker system 66.

The servers 50 and 60 have a number of additional features which provide optimisation of peer to peer (P2P) protocols in the context of a mobile network connected. They enable optimisation of the backhaul network 4 whilst maintaining transparency of a peer-to-peer ("P2P") client session that a mobile subscriber is engaged in. When a mobile device establishes a peer to peer (P2P) session over a cellular infrastructure, the peer agents 51 and 61 are established at the remote and core network side of the backhaul network 4. These components co-ordinate to behave transparently from the perspective of the mobile subscriber, their peer-to-peer counterparts 65, and other servers involved in establishing and maintaining a peer to peer session (such as trackers 66).

This means that subscriber's P2P clients 53 use existing peer to peer protocols to communicate with their peers (even though, in fact the RPA is acting on behalf of the subscriber's P2P network peers). In addition, the agent 61 uses existing peer-to-peer protocols to communicate externally with peers and other servers on behalf of the clients, again meaning that the external clients and servers are using existing peer to peer protocols and are unaware of the presence of these additional components.

The backhaul network 4 between the remote and central peer agents 51 and 61 is used to transfer user data as part of on-going peer-2-peer sessions. The system optimises data exchanged between the agents 51 and 61 by means of a split symmetrical cache architecture which can store previously transferred data at both agents. For example, when a mobile subscriber's P2P client 53 has requested a download of data from a peer, if this data has previously been transferred between RPA and CPA, and both agents still retain a copy of that data, the CPA can instruct the RPA to provide the data to the client transparently on behalf of the node that would otherwise be delivering it. Similarly, when data is being uploaded by a client to one or more peers, the RPA can instruct the CPA to provide the data on behalf of the client to its remote peer.

When the mobile network topology allows, the CPA can also indicate to a particular RPA that another RPA has the information it has requested and, for the purposes of saving bandwidth, indicate to the original RPA that it should request the information from a secondary RPA.

In this manner, peer to peer upload/download statistics are maintained transparently, allowing peer-to-peer protocols to manage upload and download rates as if the client was directly connected with its peers. This is important for example where protocols use a 'tit-for-tat' mechanism to select peers and download rates. The transparency is also maintained in handover scenarios where RPAs and CPAs co-ordinate to account for subscriber mobility.

Additionally the system uses knowledge of the network topology and the location of connected subscribers to optimise peer to peer behaviour within the network. P2P sessions can be monitored to establish the location of peers exchanging data within the network, taking particular note of each peer's location in respect of the cellular network topology. It can use this knowledge to identify peer-to-peer connections where both parties are on the same (remote) side of a backhaul connection. It then channels peer-to-peer data between those peers without the need for transferring data over the backhaul, leading to improvements in latency, throughput and bandwidth usage, whilst meeting legal intercept and billing requirements. This may happen within the context of a single RPA or across two or more interconnected RPAs. It may potentially also occur at the CPA level.

Where peers are within the cellular network topology it becomes possible to take additional factors into account such as available bandwidth, latency, cost of transmission & QOS. A feature of the invention is that this information is also used to modify the weighting of peers when establishing and maintaining peer to peer connections.

Within a cellular environment packet transfer is provided via PDP contexts which associate user connections with IP addresses; these are assigned and maintained by the core network (GGSN). Peer to peer protocols can use a client's IP address to track data flows and statistics which in turn is used to manage peer selection and availability. By correlating data from PDP contexts with peer to peer traffic flows a client's identity from a peer-to-peer network perspective can be maintained across multiple PDP contexts. This information may also be used to direct Quality of Service decisions within the cellular environment.

Referring again to FIG. 5, the components 40 and 42 may have cellular and data optimisation functions. The cellular function in the component 42 in the central optimisation server is responsible for interworking with the cellular core network. It monitors the cellular signalling to determine when cellular subscribers are utilising cellular packet data services. The central cellular component 42 monitors the activation and deactivation of PDP (Packet Data Protocol) contexts by individual mobile subscribers. It allocates a unique identifier to each PDP context when it is established and shares this information with the peer component on the remote optimisation server. The PDP specific attributes shared between the remote and central optimisation functions for each PDP context includes:

Unique PDP Identifier
Subscriber IMSI
PDP Context APN
PDP QoS parameters
PDP Address
GGSN Address
GGSN side Tunnel Identifier
Cell side Tunnel Identifier The cellular function of the component 40 of the remote optimisation server analyses the cellular user plane traffic and determines the originating subscriber and PDP context used based on the shared PDP context data. The PDP context identifier is preserved during communication between the remote and central data optimisation components. The context data can be sent between the remote optimisation node to the central optimisation either in-band as part of the data payload e.g. as a parameter in a HTML Get request or out-of band in an information element in a signalling message or as a separate message. The central optimisation node reconstitutes the tunnels towards the core network using the PDP reference parameters. The inclusion of the unique PDP context identifier enables the cellular component to the select the appropriate GPRS tunnel when interworking with the GGSN of the core network. The effect of the above steps provides protocol optimisation of cellular protocols by removing protocol overhead for user plane traffic across the backhaul while maintaining correct communication to the core network and remote RNC/Node_B.

Another feature of the invention allows for the transfer of this PDP reference information between remote servers through the central node in the event of a user moving between remote servers in a handover scenario.

The sharing of relevant PDP context parameters between the central and remote optimisation servers, 40 and 42 enables:

data optimisation on the remote and central optimisation servers to preserve the QoS parameters negotiated in the cellular domain when applying data and bandwidth optimisation, the inclusion of subscriber identity and Access Point Name (APN) as parameters to the traffic classification component, and the subscriber identity to be used as a determining factor when applying bandwidth management.

The invention is not limited to the embodiments described but may be varied in construction and detail. Where the term "base station" is used it may mean a GSM Base Transceiver Station or its equivalent, such as a 3G network Node_B or an eNode_B. The backhaul network may include any communication networks over which it is desired to limit traffic, including for example a satellite link.

The invention claimed is:

1. A communication system comprising:
   a computer having memory and a processor programmed as a remote optimisation server that communicates with a base station that provides a radio link to a mobile user terminal; and
   a central optimisation server that performs the function of a Radio Network Controller (RNC), communicates with the remote optimisation server via a backhaul network, and communicates with core network elements for data delivery to and from the mobile user terminal,
   wherein the remote and the central optimisation servers provide access to local data servers, manage communication via the backhaul network, perform data caching, and optimise transmission of data communicated via the backhaul network in order to reduce data transfer via the backhaul network in a manner which is transparent to the mobile user terminal and to the core network elements, and
   the remote and the central optimisation servers each cache data, exchange cache keys with each other via the backhaul link, and dynamically modify cache parameters including at least one of a cache key generation algorithm, cache chunk size of a data payload, and a cache data retention policy.

2. The communications system as claimed in claim 1, wherein the remote and central optimisation servers reduce transmission of data via the backhaul network in a manner which is transparent to users and to the core network elements; and wherein the central optimisation server interfaces with the core network elements for supervision, user traffic, accounting, and security.

3. The communications system as claimed in claim 1, wherein the central optimisation server emulates interfaces of a base station controller towards other core network elements.

4. The communication system as claimed in claim 1, wherein the central optimisation server performs compression.

5. The communication system as claimed in claim 1, wherein the central optimisation server performs protocol optimisation.

6. The communication system as claimed in claim 1, wherein the remote optimisation server implements a subset of RNC, SGSN and GGSN functionality at the remote site to expose un-encapsulated and un-encrypted user IP traffic at the remote site so that this IP traffic can be managed and optimised; and wherein the remote optimisation server performs direct IP access to local data stores, enabling local data access at the base station site and use of standard and enhanced IP optimisation techniques for backhaul communication.

7. The communication system as claimed in claim 1, wherein the remote optimisation server comprises a traffic classifier, a user data optimisation function, and a backhaul link manager; and wherein the backhaul link manager accesses a local data store.

8. The communication system as claimed in claim 1, wherein the central optimisation server comprises a backhaul link manager, a user data optimisation function, and a protocol relay function; and wherein the remote optimisation server includes a traffic classifier which performs traffic inspection and separation of the traffic into different categories, and tagging the different categories before submitting to the backhaul link manager; and wherein the remote optimisation server blocks certain classifications of traffic from backhaul communication at certain times; and wherein the backhaul link manager dynamically selects bearers according to traffic classification; and wherein the selection is made according to quality-of-service criteria and user device.

9. The communication system as claimed in claim 1, wherein the servers perform traffic optimisation including caching to ensure that only changed objects within a page are downloaded across the backhaul, pre-fetching; traffic analysis to determine data to be downloaded during off-peak times, data compression; compression algorithms for headers and payload, and header compression.

10. The communication system as claimed in claim 1, wherein the remote optimisation server comprises a HTTP accelerator which uses client and server side optimisation functions to retrieve a bundle of resources associated with a request for base HTML; and wherein the HTTP accelerator maintains a set of persistent connections over which all HTTP traffic is carried; and wherein the HTTP accelerator has a split proxy architecture in which functionality is distributed across servers on both ends of the backhaul link; and wherein a remote proxy appears as an HTTP proxy to a browser running on a user device at a remote site, and a central proxy acts as a typical Web client to Web servers.

11. The communication system as claimed in claim 1, wherein the optimisation servers perform optimisation based on which objects are in the user's viewport; the size of the objects; the order in which a browser requests the objects; object type; a priority access group of the user; and wherein IP traffic is directly associated with a specific cellular user identifier.

12. The communication system as claimed in claim 1, wherein the optimisation servers perform the following in order to serve a HTTP Web page request:
   when a base page is required at a client, an initial GET request is sent by the browser for this page;
   a remote proxy intercepts this GET request and forwards the URL to a central proxy;
   the central proxy fetches a base page associated with the URL from a Web server and passes it to a scheduler and compression engine of the central optimisation server, which schedules the base HTML for transfer to the remote site over persistent connections;
   the central proxy parses the base HTML and immediately retrieves the associated Web resources that are embedded in that page, and compresses and schedules these resources for transfer to the remote site;
   at the remote site, the remote proxy parses the base HTML to determine which resources will be transferred and then it passes the base HTML to the client; and when the client makes subsequent requests for the associated resources, the remote proxy first determines if the resources are being transferred and if so the request from the client is delayed until the resource arrives, otherwise, if this is a new request for a new base page then the system executes the steps outlined above.

13. The communication system as claimed in claim 1, wherein the optimisation servers maintain transparency of peer-to-peer sessions of a mobile device while reducing data traffic on the backhaul link, wherein the remote optimisation server comprises a remote peer agent and the central optimisation server comprises a central peer agent, the remote peer agent acting on behalf of a mobile client's network peers, and the central peer agent acting on behalf of mobile clients, and said agents act transparently to both the mobile clients and to their network peers.

14. The communication system as claimed in claim 13, wherein the agents both cache the data in a split symmetrical cache architecture, in which the cache keys are exchanged between the servers via the backhaul link; and wherein a server inspects data which it sends to the other server, and dynamically modifies the cache parameters including the queue size, or the key generation algorithms, or the chunk size, or the cache data retention policy; and wherein the central peer agent informs the remote peer agent that requested data is available on a secondary remote peer agent of the same or a different remote optimisation server of the system; and wherein the agents monitor peer-to-peer connections and locations of mobile clients; and wherein the agents use said monitored information to channel peer-to-peer data between peers on the same side of the backhaul network requiring little or no usage of the backhaul network; and wherein the agents modify criteria for selecting peers when establishing and maintaining peer-to-peer connections.

15. The communication system as claimed in claim 13, wherein the agents both cache the data in a split symmetrical cache architecture, in which the cache keys are exchanged between the servers via the backhaul link; and wherein a server inspects data which it sends to the other server, and dynamically modifies the cache parameters including the queue size, or the key generation algorithms, or the chunk size, or the cache data retention policy; and wherein the central peer agent informs the remote peer agent that requested data is available on a secondary remote peer agent of the same or a different remote optimisation server of the system; and wherein the agents monitor peer-to-peer connections and locations of mobile clients; and wherein the agents use said monitored information to channel peer-to-peer data between peers on the same side of the backhaul network requiring little or no usage of the backhaul network; and wherein the agents modify criteria for selecting peers when establishing and maintaining peer-to-peer connections; and wherein the criteria include location, quality of radio link, or capacity of a remote cell, or capacity of the backhaul.

16. The communication system as claimed in claim 13, wherein the agents both cache the data in a split symmetrical cache architecture, in which the cache keys are exchanged between the servers via the backhaul link; and wherein a server inspects data which it sends to the other server, and dynamically modifies the cache parameters including the queue size, or the key generation algorithms, or the chunk size, or the cache data retention policy; and wherein the central peer agent informs the remote peer agent that requested data is available on a secondary remote peer agent of the same or a different remote optimisation server of the system; and wherein the agents monitor peer-to-peer connections and locations of mobile clients; and wherein the agents use said monitored information to channel peer-to-peer data between peers on the same side of the backhaul network requiring little or no usage of the backhaul network; and wherein the agents modify criteria for selecting peers when establishing and maintaining peer-to-peer connections; and wherein the agents maintain a client's identity, across multiple packet data protocol contexts.

17. The communication system as claimed in claim 13, wherein the agents both cache the data in a split symmetrical cache architecture, in which the cache keys are exchanged between the servers via the backhaul link; and wherein a server inspects data which it sends to the other server, and dynamically modifies the cache parameters including the queue size, or the key generation algorithms, or the chunk size, or the cache data retention policy; and wherein the central peer agent informs the remote peer agent that requested data is available on a secondary remote peer agent of the same or a different remote optimisation server of the system; and wherein the agents monitor peer-to-peer connections and locations of mobile clients; and wherein the agents use said monitored information to channel peer-to-peer data between peers on the same side of the backhaul network requiring little or no usage of the backhaul network; and wherein the agents modify criteria for selecting peers when establishing and maintaining peer-to-peer connections; and wherein the agents maintain a client's identity, across multiple packet data protocol contexts; and wherein the servers monitor activation and deactivation of packet data protocol PDP contexts, to allocate an identifier to each context, and sharing the identifiers with the other server.

18. The communication system as claimed in claim 1, wherein the remote and central optimisation servers retrieve data through the core network even if it is delivered from a cache by the remote optimisation server without being sent over the backhaul link; and wherein the remote optimisation server delivers said data only after it has been pulled through the core network to the central optimisation server; and wherein the remote optimisation server delays delivery until after receipt of a permission from the central optimisation server.

19. The communication system as claimed in claim 1, wherein the system comprises a plurality of remote optimisation servers; and wherein a remote optimisation server pushes data to another remote optimisation server; and wherein the remote optimisation servers are in a cluster architecture and share the same backhaul network.

20. A non-transitory, tangible computer readable storage medium storing software code which, when executed in the system as claimed in claim 1, performs operations of the optimisation servers.

21. The communication system as claimed in claim 1, wherein the remote optimisation server monitors cache usage, and decides on use of the backhaul network on the basis that more backhaul capacity will be available if the cache usage is high, and the remote optimisation server dynamically modifies quality-of-service parameters according to said monitoring of cache usage as an indicator of backhaul network usage.

22. A communication system comprising:
a computer having memory and processor programmed as
a remote optimisation server with a base station that provides a radio link to a mobile user terminal; and
a central optimisation server that communicates with the remote optimisation server via a backhaul network and communicates with core network elements for data delivery,
wherein the remote and the central optimisation servers provide access to local data servers, manage communication via the backhaul network, perform data caching, and optimise transmission of data communicated via the backhaul network in order to reduce data transfer via the backhaul network in a manner which is transparent to users and to core network elements, the remote optimisation server monitors cache usage and decides on use of the backhaul network accordingly on the basis that more backhaul capacity will be available if the cache usage is high; and the remote optimisation server dynamically modifies quality-of-service parameters according to said monitoring of cache usage as an indicator of backhaul network usage, and the central optimisation server comprises a backhaul link manager, a user data optimisation function, and a protocol relay function, and the remote optimisation server includes a traffic classifier which performs traffic inspection and separation of the traffic into different categories, and tags the different categories before submitting to the backhaul link manager, the remote optimisation server blocks certain classifications of traffic from backhaul communication at certain times, the backhaul link manager dynamically selects bearers according to traffic classification, and the selection is made according to quality-of-service criteria and user device.

23. A communication system comprising:

computer having memory and a processor programmed as a remote optimisation server that communicates with a base station that provides a radio link to a mobile user terminal; and a central optimisation server that communicates with the remote optimisation server via a backhaul network and communicates with core network elements for data delivery, wherein the remote and the central optimisation servers provide access to local data servers, manage communication via the backhaul network, perform data caching, and optimise transmission of data communicated via the backhaul network in order to reduce data transfer via the backhaul network in a manner which is transparent to users and to core network elements, the remote optimisation server monitors cache usage, and decides on use of the backhaul network accordingly on the basis that more backhaul capacity will be available if the cache usage is high, and the remote optimisation server dynamically modifies quality-of-service parameters according to said monitoring of cache usage as an indicator of backhaul network usage, and the remote and central optimisation servers retrieve data through the core network even if it is delivered from a cache by the remote optimisation server without being sent over the backhaul link, the remote optimisation server delivers said data only after it has been pulled through the core network to the central optimisation server, and the remote optimisation server delays delivery until after receipt of a permission from the central optimisation server.

* * * * *